Patented Apr. 29, 1924.

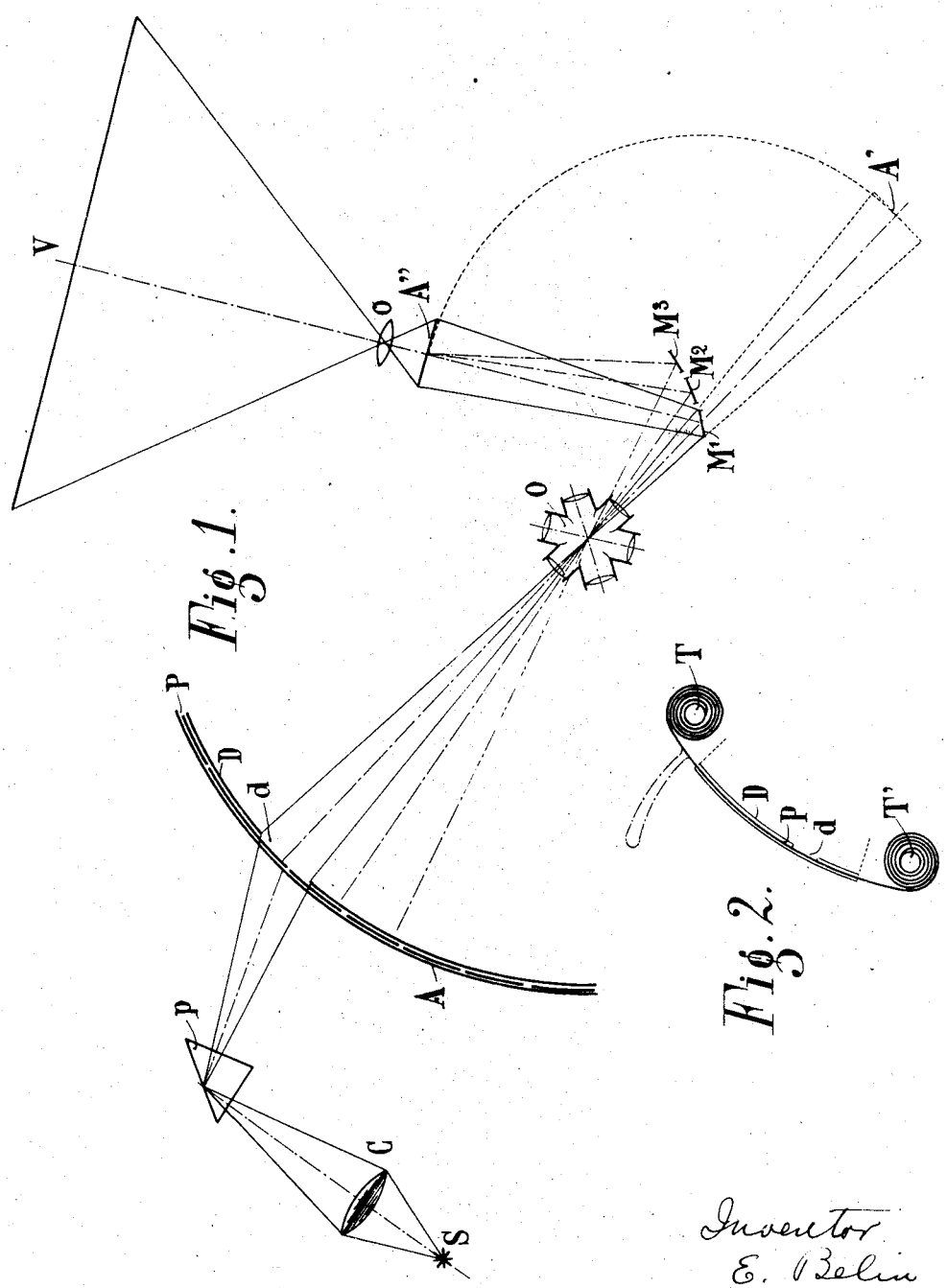

1,492,503

UNITED STATES PATENT OFFICE.

EDOUARD BELIN, OF PARIS, FRANCE.

METHOD OF AND APPARATUS FOR CINEMATOGRAPHY.

Application filed May 5, 1915. Serial No. 25,998.

(GRANTED UNDER THE PROVISIONS OF THE ACT OF MARCH 3, 1921, 41 STAT. L., 1313.)

*To all whom it may concern:*

Be it known that I, EDOUARD BELIN, residing at Paris, in the Republic of France, have invented certain new and useful Method of and Apparatus for Cinematography (for which I have filed applications for patents in Germany, dated May 5, 1914, and in France, dated Sept. 4, 1914), of which the following is an exact and complete description.

If under the general designation of "kinematograph" we include every apparatus capable of registering by means of photography the motion of movable objects and of reproducing such motion on a projecting screen while utilizing by way of synthesis the series of proofs made by analysis, it may be said that hitherto all kinematographs have been based upon the general principles of chromophotography.

These principles have fundamental defects, viz:

1. Motion is obviously discontinuous and the impression made on the spectator is jerky on account of gaps occurring between two images.

2. During the projection, the speed of change of picture is clearly greater than true motion depicted.

3. The length of the film has to be greatly increased in order to reduce such undesirable defects.

4. The focusing time of each picture is very limited in view of which monochromes cannot be possibly obtained.

5. The luminosity during the projection decreases on account of extinctions.

6. Physical fatigue is unavoidable, in consequence of the blinking on the part of the observer due to successive occlusions.

The object of this invention is an apparatus founded on a novel principle doing away with all the above defects and invariably reproducing true motion as instead of being based on retinal persistence it is based on a diametrically opposite principle, i. e., that of continuous luminosity.

Hence an apparatus based on the same principle and merely furnished with a supplementary part allows the production of a kinematographical projection in colors having the same advantages of continuity and truthfulness. Owing to the new conditions of this process, longer focusing times promote to a great extent the production of monochromatic films.

In the accompanying drawings:

Figure 1 is a diagrammatic view demonstrating the optical principles on which this invention is based.

Figure 2 is a detail view showing how the intermittent movement of the film is effected.

General principles.

Let A Fig. 1 be a transparent cylindrical surface against which bears a film P carrying a succession of diapositive pictures similar to ordinary kinematographic films and let S be a powerful luminous source furnished with a condenser C and an object glass forming a lighted rectangle having the same size as an elementary image. It may be assumed that by the aid of prisms or turning mirrors, the light from such source can be made to sweep over the film P while lighting up the elementary pictures at the same time as a diaphragm D moves on the other side of the film being provided with a rectangular opening $d$ of the same size as an elementary proof.

It may be assumed that by the aid of prisms $p$ the light from this source may sweep the film P while lighting up one after the other the elementary pictures at the same time as a diaphragm D moves on the other side of the film.

Let there be an object glass having a small field angle and placed at O in such a manner that the axis of the cylinder A may intersect the optical axis at the focal point. This object glass forms upon the cylindrical surface $A^1$ the image of the film P and as the elementary diapositives are lighted up one after the other the pictures are formed at $A^1$ in the same manner one after the other. If the radius of the cylinder is equal to twice the principal focal length of the objective, the pictures will have the same size as the originals on the film and the surface $A^1$ having the same radius as A will be on the same cylinder and symmetrical relatively to the object glass O. By reflecting the instant rays with the aid of a reflecting surface M¹ the pictures which should have been regularly formed at A¹ may be transmitted in a properly selected direction. Let us consider such a mirror M¹ casting at A″ the picture A¹ and let us use the same arguments and a similar construction for the second picture. But instead of bringing the second to one side of A″ let it coincide with the latter. To this end the mirror M² is placed in a different position from that of the mirror M¹. Let us thus continue for each picture and let us see what should be the position of the mirrors. For this purpose let us merely consider the centre of each picture. In order that all the pictures may be equally superposed, it is necessary and sufficient that the sum of the lengths of the radii of incidence and of reflection should be constant, that is to say that $OM + M^1A'' = OA^1$. Now O and A″ are two fixed points. The centres of the mirrors should thus be placed upon an ellipse having O and A¹ as foci.

If in such a system a white screen or a roughened glass is placed at A″ and if the object glass O is turned about while being guided successively towards each the diapositives disclosed at the same time by the diaphragm and lighted up by the turning prism, an observer will see but a single picture continuously lighted and strictly motionless, for as fast as the diaphragm discloses one of the elementary diapositives, it conceals the corresponding part of the preceding print or image. If the photographs placed in A have been taken one after the other and if the subject included at that time movable objects such as moving persons for instance, the observer will see at A¹ that:

1. Motionless objects remain so during the projection.
2. Persons move about as in reality.

If then the mode of projection corresponds to that of views taken the reproduction appears lifelike and it appears that:

1. Owing to the combined motions of light, diaphragm and object glass being continuous, the projection is continuous.
2. This continuity does away with failures or gaps. Motion which is strictly continuous is reproduced as such.
3. The removal of all occlusions does entirely away with blinking, twinkling or scintillations.
4. The continuity of the projection avoids all physiological exertion. There is no further reason to rely upon retinal persistence.
5. And for the same reason the absurd necessity of an accelerated projection disappears "ipso facto."

Yet the living view A¹ is small and it could not be otherwise as the object glass O having a very small angle is sufficiently distant from A to go over a considerable number of proofs through a feeble angular motion.

A″, may be cast on a ground glass screen and the real picture thus rendered visible being taken as a luminous object the same may be retaken by an object glass with a very short focus casting upon the final screen a very much enlarged projection. But such an arrangement would have the defect of absorbing an enormous amount of light and it is preferable as is usually done in the compound microscope to retake by means of the object glass of the projection o not the really visible picture but the aerial picture formed by O.

The projection appears then dazzling provided however that the object glass lenses be large enough to be entirely included in the luminous rays which meet them.

This being so the whole of a new kinematograph may be conceived with the following diagrammatic arrangement:

1. A registering apparatus for taking views (Fig. 1) such as any suitable lighted up object V.

If this object is observed through a converging lens of large opening or through a divergent lens, the eye perceives between the object and the lens and apparently on the lens a clear virtual picture at a distance of distinct vision or at any greater distance.

It is this picture that is to be photographed by the object glass of the apparatus after the rays have been reflected through the series of mirrors placed upon the elliptical surface. The apparatus is thus composed of a suitable optical device o capable of producing a virtual picture—either straight or reversed—of the photographed subject.

A series of mirrors M, M¹, M″, etc., placed along an ellipse and suitably regulated, reproduce this picture in as many juxtaposed pictures owing to the interposition of an object glass O placed upon one of the foci of the ellipse the while the picture lens which is placed at the other focus.

At the focal plane and along a cylinder A is placed a sensitive film P before which moves a rectangular diaphragm D with an opening having the size of an elementary picture.

At the commencement of operations the diaphragm being at one of the extremities of the cylindrical surface A occupied by the film and the object glass O being directed towards this same place, a first picture is printed and is strictly clear. The object glass is then turned about its focal point at the same time as the diaphragm p goes over the film P. The pictures corresponding to each mirror pass along successively in order to be printed upon the film while being placed in juxtaposition over it. Motionless objects take up similar positions upon each proof and movable objects take up the space over which they have passed during the time when each region has been disclosed. At every moment without any exception each object imprints its own picture and the simultaneous superposition of all the elementary images could not produce here any discontinuous pictures of movable objects but a continuous picture similar to that produced by a movable object passing before a fixed plate. The main feature is that the focusing time should be short enough for the outlines to remain clear on each elementary image. In ordinary instantaneous photography the distinctness of a movable object is but an approximation. Theoretically the object is always deformed.

After the portion of the cylinder—the circular length of which is equal to the product of the length of a proof by the number of mirrors—has been gone over by the object glass, a suitable contrivance replaces this strip by another, the diaphragm and the object glass return to their starting point and everything is ready to start anew.

To avoid an interruption—however short it may be—which would be necessary for this return of the diaphragm and of these mirrors to their starting point, an endless band may be used, this band being provided with equidistant openings forming a diaphragm while a multiple object glass formed of several tubes arranged symmetrically and regularly around an axis of rotation may be further employed.

In the case of an angle of travel of 60° for instance, the object glass would be formed of six tubes forming between them angles of 60° and carrying each one of the two lenses of a unique symmetrical system.

2. A projecting apparatus.—(Fig. 1). This reproducing or projecting apparatus allows the general principle above set forth to be carried into practical effect.

It comprises:
1. A powerful luminous source S.
2. A turning reflector, prisms or mirrors P.
3. A transparent cylindrical surface A of glass, for instance having an arc of 60°.
4. A turning object glass O having several symmetrical tubes similar to that of the registering apparatus.
5. A set of mirrors $M^1$, $M^2$, $M^3$, etc., placed upon an elliptical surface.
6. A second object glass $o$ with a short focus.

The positive film P bears against the glass cylindrical surface A and is formed by the series of images to be projected.

In front of this film moves a strictly opaque endless band D which is provided from place to place and at suitable distances with a rectangular opening $d$ having the exact size of an elementary image. The turning optical reflecting device $p$, the diaphragm D and the object glass O are driven by the same gear so as to ensure the perfect synchronism of their movements.

Furthermore as in the registering apparatus, a suitable mechanical device moves the view which has just been projected while pulling in its place the one which will have to be projected later on and owing to this motion from place to place, the length of the film corresponding to that of the arc is entirely renewed when the diaphragm having gone over the last image the following opening starts over a new series of images.

It will be seen with reference to Fig. 2 that the film P is stretched between two drums T, $T^1$, the diaphragm D moving in front of and against the same. During this motion the drum T turns, the film is unwound so as to form a loop the length of which is equal to that of the arc when the opening of the diaphragm has ended its stroke. At this moment the diaphragm discloses another opening and the drum $T^1$ suddenly winds up the film while tightening up the loop in front of the diaphragm in lieu of the arc which has just disappeared. If for instance the length of the arc is 60 degrees and if each image has a base of 2 degrees the time during which the opening goes over will be exactly 2 seconds for a set of 15 images per second.

During such time which is relatively long the preceding mechanical operation can be readily effected.

Application of similar principles and like devices to the projection of living views in colors will now be described.

It follows from the above description and from an examination of Fig. 1 that the same apparatus as there involved may carry out colored cinematography.

Let us first consider the registering apparatus and let us replace the white transparent cylindrical surface A by a surface having the same shape and formed by colored glasses having each the same size as an elementary picture. Let us select such glasses according to two ternaries and let us adopt the following ternary: orange red, green, violet blue. Let us arrange these glasses always in the same order for instance: orange red, green, violet blue, orange red, green, etc. Let the opening of the moving window be modified and let its size be no more that of one elementary picture but covering three pictures so that each picture itself is one-third the size of the ordinary picture element.

If the sensitive film used is above all panchromatic, three elementary pictures will form a simultaneous impression on the film, but by reason of the colored filters the negatives thus formed are incomplete and will produce the one blue, the other red, and the last yellow radiations.

By using the same arguments as for black photography it will be understood that the continuous motion of the window will cause without interruption the picture of blue radiations to be printed and likewise that of red radiations as well as that of yellow radiations.

The speed of the window will have to be triple and the same length of film will only serve for a three times shorter period. It is proper to notice a point of the highest importance. In ordinary cinematography all trials hitherto made for trichroism have been rendered very difficult owing to insufficient focusing time.

With the new arrangement, this focusing time is greatly increased by the two following reasons:

1. All the time devoted to occlusion heretofore useless is added to removal focusing.

The new principle does not appeal to retinal persistence and not having to allay twinkling effects since the latter exist no more, the multiplication of the number of images is no more necessary and the focusing time being in an inversely proportional ratio to the frequency of impression; conditions become thus far more satisfactory.

With regards to projections, the arrangement is the same and the ternary used is preferably that comprising blue, red and yellow.

The considerations set forth relatively to focusing time apply here to the luminous power of the colored projection.

The aerial image photographed in the first operation is obviously seen by the object glass under three different angles and it is obvious that if the same object glass serves to reproduce it in the second operation there can be no possible deformation. But there is another defect which is far more serious but disappears readily if the object photographed by the object glass was the original object with all its differences of planes, the elementary images would act during the projection as stereoscopical images and the extreme pictures would project on the right and left hand side of the central picture without a correct fitting up being possible owing to parallax.

Now in the present conditions the photographed object is a plane aerial picture. All the planes merge into only one, and the parallax effect is entirely avoided, even when the object glass used for the synthesis of the three elementary pictures has not the same constants as that used for the analysis.

To all the technical advantages which are the essential features of this new kinematographic process, it is meet to add others of a material nature.

First of all by reason of the continuity of the views, it will be no more necessary to multiply beyond measure the number of elementary pictures and it must result from this fact a considerable economy in the consumption of films.

On the other hand the substitution of a reserved space between two pictures for the two margins generally used, causes likewise an economy which though smaller than the preceding one is still worthy of consideration of the length of films now used in cinematography is taken into account.

Having now particularly described and ascertained the nature of the said invention, and the manner in which the same is to be performed, I declare that what I claim is:

1. The method of producing cinematographic pictures which consists in intermittently moving reproductions in a cylindrical path, visually combining the images of consecutive reproductions, inserting elliptically arranged concave reflecting surfaces in the path of the rays of light, and collecting and condensing said rays before and after reflection on the elliptical surfaces.

2. The method of producing cinematographic pictures which consists in intermittently moving consecutive reproductions in a substantially cylindrical path, consecutively uncovering a series of said reproductions, visually combining and superposing the images of said consecutive reproductions, inserting concave elliptical reflecting means in the path of the rays and intermediate the reproductions and the images thereof, and condensing and collecting said rays in the foci of said elliptical reflecting means.

3. Cinematographic apparatus comprising in combination elliptically arranged concave reflecting surfaces, objective lenses in the two foci of said elliptical surfaces, a reproducing, registering and projecting surface beyond the lenses at one end of said elliptical surface and substantially cylindrical reproducing means beyond the other objectives.

4. Cinematographic apparatus, comprising in combination an elliptically arranged concave reflecting surface, an objective in one of the foci of said surface, a reproducing, registering and projecting screen beyond said objective, a circularly and intermittently movable consecutive series of reproductions, a shutter movable longitudinally of said reproductions, a plurality of circularly arranged objectives, rotatable in the other focus as a pivot, and means to intermittently feed a series of said reproductions.

5. In a cinematographic apparatus as specified in claim 5, a transparent cylindrical surface covering said consecutive series of reproductions opposite said shutter, a source of light outside said cylindrical surface and outside said screen, and means to unobstructedly guide the emitted rays of light onto the cylindrical surface opposite the light admitting means of said shutter.

In testimony whereof I have hereunto signed my name this 20th day of April, 1915, in the presence of two subscribing witnesses.

EDOUARD BELIN.

Witnesses:
WM. C. POOLE, Jr.,
EMILE BERTRAND.